United States Patent [19]

Finkelstein

[11] Patent Number: 5,060,265

[45] Date of Patent: Oct. 22, 1991

[54] METHOD OF PROTECTING A LINEAR FEEDBACK SHIFT REGISTER (LFSR) OUTPUT SIGNAL

[75] Inventor: Louis D. Finkelstein, Wheeling, Ill.

[73] Assignee: Motorola, Inc., Schaumburg, Ill.

[21] Appl. No.: 556,132

[22] Filed: Jul. 23, 1990

[51] Int. Cl.$^5$ .............................................. H04L 9/00
[52] U.S. Cl. ........................................ 380/46; 380/50;
364/224.21
[58] Field of Search ................ 380/46, 50; 364/224.21

[56] References Cited

U.S. PATENT DOCUMENTS

| | | | |
|---|---|---|---|
| 3,911,330 | 10/1975 | Fletcher et al. ...................... | 380/46 |
| 4,755,987 | 7/1988 | Lee et al. .............................. | 380/46 |
| 4,757,532 | 7/1988 | Gilham ................................... | 380/23 |
| 4,827,514 | 5/1989 | Ziolko et al. ......................... | 380/46 |
| 4,893,339 | 1/1990 | Bright et al. ......................... | 380/46 |
| 4,907,271 | 3/1990 | Gilham ................................... | 380/46 |

Primary Examiner—Thomas H. Tarcza
Assistant Examiner—David Cain
Attorney, Agent, or Firm—Val Jean F. Hillman

[57] ABSTRACT

The present invention discloses a method of protecting a pseudorandom (PN) signal generated by a linear Feedback Shift Register (LFSR) from cryptographic attack. This is accomplished by first receiving a PN output signal generated by an LFSR, or by clocking an LFSR to produce a PN output signal. Thereafter, non-linearity is deterministically introduced into the PN signal to produce a deterministic bit pattern. According to the suggested embodiments, the introduction of non-linearity is accomplished by altering at least one bit of the PN signal sequence. Next, the deterministic bit pattern is substituted in place of the LFSR PN signal, thereby protecting the PN signal from cryptographic attack.

20 Claims, 2 Drawing Sheets

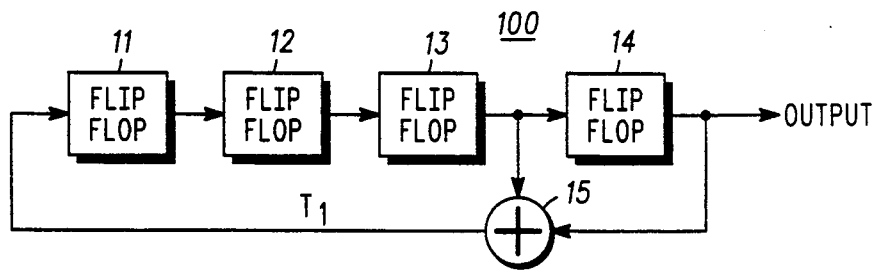
*FIG.1A*
TABLE 1
| CLOCK CYCLE | LSFR STATE | | | |
|---|---|---|---|---|
| | 11 | 12 | 13 | 14 |
| 0 | 1 | 0 | 0 | 0 |
| 1 | 0 | 1 | 0 | 0 |
| 2 | 0 | 0 | 1 | 0 |
| 3 | 1 | 0 | 0 | 1 |
| 4 | 1 | 1 | 0 | 0 |
| 5 | 0 | 1 | 1 | 0 |
| 6 | 1 | 0 | 1 | 1 |
| 7 | 0 | 1 | 0 | 1 |
| 8 | 1 | 0 | 1 | 0 |
| 9 | 1 | 1 | 0 | 1 |
| 10 | 1 | 1 | 1 | 0 |
| 11 | 1 | 1 | 1 | 1 |
| 12 | 0 | 1 | 1 | 1 |
| 13 | 0 | 0 | 1 | 1 |
| 14 | 0 | 0 | 0 | 1 |
| 15 | 1 | 0 | 0 | 0 |
| 30 | 1 | 0 | 0 | 0 |
| 45 | 1 | 0 | 0 | 0 |
*FIG.1B*
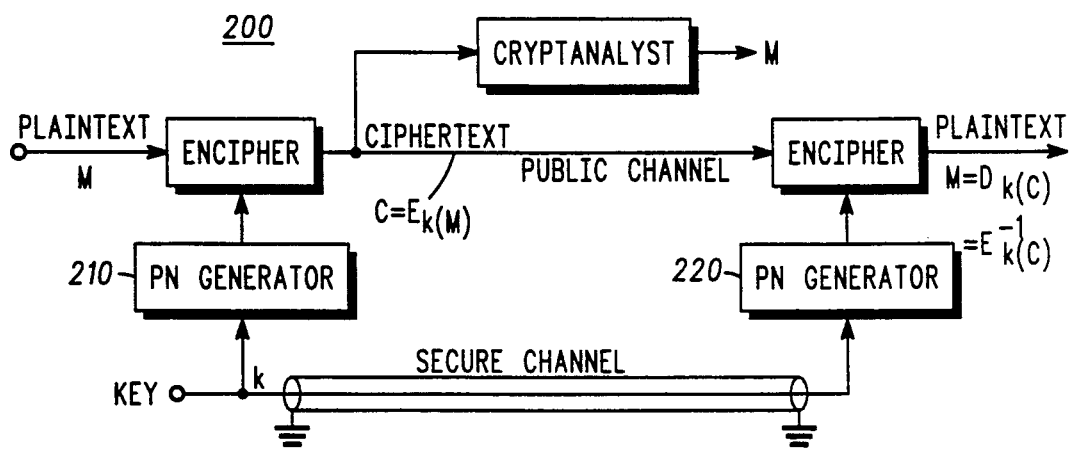
*FIG.2*

METHOD OF PROTECTING A LINEAR FEEDBACK SHIFT REGISTER (LFSR) OUTPUT SIGNAL

TECHNICAL FIELD

The present invention relates generally to a cryptographic method and system. In so doing, it addresses the use of a linear feedback shift register (LFSR) as a pseudorandom signal generator. Specifically, however, the present invention pertains to a cryptographic method and apparatus wherein a LFSR output signal is made non-linear and thereby protected from cryptographic attack.

BACKGROUND OF THE INVENTION

LFSRs are well known in the art. Typically, these devices are utilized in operations where the generation of a pseudonoise/pseudorandom (PN) signal is required. A PN signal is a binary signal, which appears to be random. In reality, a PN signal is not random at all; it is a deterministic, periodic signal whose periodicity is dependent upon the number of stages within the LFSR, the feedback taps, and the LFSR's initial conditions. Typical operations employing LFSR's as PN signal generators are: spread spectrum systems, noise generators, and cryptographic systems hereinafter referred to as cryptosystems.

FIG. 1 depicts a simplistic representation of an LFSR 100. Mathematically, the LFSR defines an Nth degree polynomial (where N is the length of the LFSR) with one coefficient for each "tap" (output bit) used to form the feed back signal. Accordingly, the LFSR 100 is definable as a forth degree polynomial, comprising the four stages 11-14, with feedback signal $T1$, which performs an exclusive-or operation on the output of stage 13 and 14 and feeds that operation back to the input of stage 11.

It will be appreciated by those skilled in the art that the LFSR 100 is a simplistic model of a PN signal generator, for use as, for example, the encryption key, which dictates a specific encryption transformation for a cryptosystem. This particular example was selected primarily to show that an LFSR Of the Nth degree is ultimately periodic in $2^n-1$ bits (see Table. 1).

In the preferred embodiment, LFSR 100 comprises a 64 stage shift register, providing a 64th degree polynomial. Approximately 32 taps are used to create the desired PN signal. Accordingly, the 64 bit maximal length LFSR will produce a digital sequence having approximately $1.84 \times 10^{19}$ bits. At 12 KHz, it would take nearly 50 million years for this sequence to repeat. As PN signal generators increase in sophistication, typical values reach 80 to 100 stages with anywhere from 40 to 50 taps, in which case the sequences can be expected to repeat every $4 \times 10^{16}$ years.

The primary goal of any cryptosystem is to prevent the unauthorized introduction (spoofing) or extraction (eavesdropping) of information from the communication channel. Since the previously discussed encryption keys repeats so infrequently, one might suppose that a cryptosystem utilizing these keys would be unconditionally secure. Unfortunately, any cryptosystem that uses an LFSR to generate the encryption key is extremely vulnerable to attack.

The Cryptosystems weakness is caused by the LFSR's linearity. Since the PN signal is generated by an algorithm, knowledge of the algorithm reveals the entire sequence. While it takes $2^n-1$ bits for a PN sequence to repeat, a cryptanalyst needs only 2 n bits of plaintext and its corresponding ciphertext to determine the feedback taps, the initial state of the register, and ultimately the entire PN signal. This vulnerability represents a major drawback to the continued use of LFSRs in modern cryptosystems.

Accordingly, it would be extremely advantageous to provide a cryptographic method and apparatus wherein the PN signal of an LFSR is made non-linear, thereby rendering the cryptosystem virtually indecipherable.

SUMMARY OF THE INVENTION

Accordingly, a general object of the present invention is to provide a cryptographic method and apparatus.

It is another object of the present invention to provide a cryptographic method and apparatus utilizing a LFSR to generate a PN signal.

It is the ultimate object of the present invention, however, to provide a cryptographic method and apparatus wherein the PN signal is made non-linear, thereby rendering the cryptosystem virtually indecipherable.

These and other objects are achieved by the present invention which is briefly described as a method of protecting a Linear Feedback Shift Register (LFSR) output signal. This invention is based on the recognition that after the capture of 2 n bits of ciphertext and its plaintext equivalent, a cryptanalyst, using known techniques, can easily decipher the algorithm that generates the entire PN sequence. Accordingly, the present invention discloses a method and apparatus for protecting the pseudorandom (PN) signal generated by a Linear Feedback Shift Register (LFSR) from cryptographic attack. This is accomplished by introducing non-linearity into the PN signal generated by an LFSR.

In one embodiment non-linearity is introduced by altering the state of at least one bit of the PN signal in order to produce a deterministic bit pattern. This bit pattern is then used as the cryptosystem's PN signal instead of the LFSR PN signal. In an alternative embodiment, the location of at least one bit of the PN signal is repositioned in order to once again introduce non-linearity into the otherwise linear output of an LFSR. In this fashion, the cryptanalyst's task is made increasingly more difficult, thereby rendering the cryptosystem virtually impervious to attack.

BRIEF DESCRIPTION OF THE DRAWINGS

FIGS. 1a and 1b depict a simple LFSR representation;

FIG. 2 depicts a model cryptographic channel; and

DETAILED DESCRIPTION OF THE PREFERRED EMBODIMENT

Figure 3:
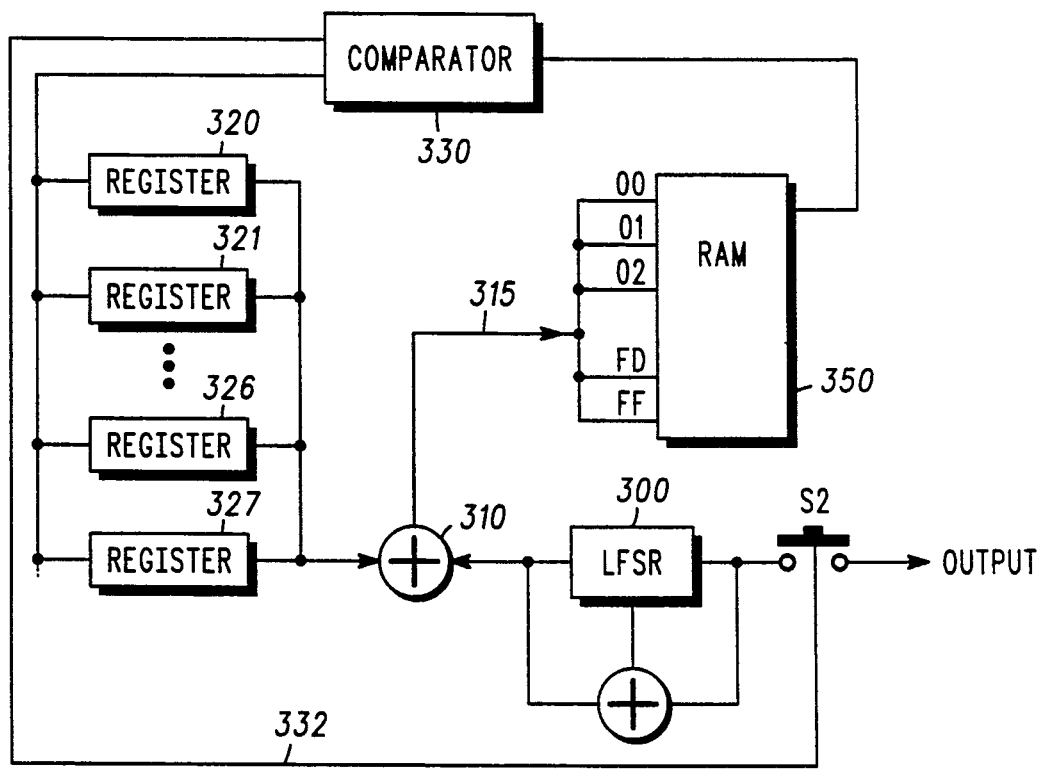
FIG. 3 depicts a portion of the cryptosystem according to the present invention.

A principal application of the present invention is for a PN signal generator like those employed in the field of cryptography. FIG. 2. depicts a model of a cryptographic channel 200. In operation, a message, or plaintext M, is encrypted via transformation, $E_k$, to produce ciphertext, $C=E_k(M)$. The ciphertext is then transmitted over lo an insecure or public channel. When an authorized listener receives the ciphertext C, she deciphers it with the inverse transformation, $D_k=E_k^{-1}$, to obtain the original plaintext message as follows:

$$D_k(C) = E_k^{-1}[E_k(M)] = M \qquad (1).$$

The parameter K refers to a set of characters or symbols called a key, which dictates the encryption transformations $E_k$ and $D_k$. In the cryptosystem of FIG. 2, the key K is manipulated by PN signal generators 210 and 220 to create a key stream. This key stream is ultimately exclusiveored with the plaintext M for encryption and with the ciphertext C for decryption. Anyone having access to the key therefore, can encrypt and decrypt plaintext messages. Accordingly, the key is transmitted between authorized users via secure channels only. In a cryptographic attack, the goal of the cryptanalyst is to produce an estimate of the plaintext message, M, by analyzing the ciphertext obtained from the public channel, without benefit of the key.

As previously discussed, when the PN signal generators 210 and 220 employ LFSRs, the cryptosystem becomes extremely vulnerable to attack. This attack, known as a plaintext attack, involves knowledge of the plaintext and knowledge of its ciphertext counterpart. Armed with this information the competent cryptanalyst can successfully decrypt the message intercepted from the public channel. While knowledge of the plaintext will not always be readily available to the cryptanalyst, plaintext attacks occur with sufficient frequency that no cryptosystem is considered secure unless it is designed to defeat this threat.

In order to secure the system against such cryptographic attacks, the present invention suggests the introduction of non-linearity into the PN signal sequence. To aid in this discussion, refer to FIG. 3. FIG. 3 depicts a portion of the cryptosystem according to the present invention. In operation, LFSR 300, which is capable of being implemented via flip flops, latches, shift registers, working registers, memory device addresses, or as a software variable is identical to the LFSR 100 previously discussed.

According to the present invention, the LFSR 300 content is modulo-two added to the content of one of a plurality of selectively addressed registers 320-327 via exclusive-or gate 310. This summation generates an address signal which can be any function of the LFSR and register contents. The address is then transmitted along address bus 315 to address a preprogrammed RAM look-up table 350. Thereafter, a RAM look-up table entry corresponding to the address signal is sent to the comparator circuit 330. The comparator 330 compares the RAM look-up table entry with a reference bit pattern, in this case, the contents of the register selectively added to the LFSR's content. It will be appreciated that other reference bit patterns are available, as for example, the LFSR contents, flip flop contents, latch contents, shift register contents, working register contents, memory device address contents, or the contents of a software variable.

Assuming the look-up table entry and the reference bit pattern values do not compare, the LFSR 300 output signal will not be altered. Upon a comparison, however, the comparator 330 will direct switch S2, via control line 332, to open. According to this embodiment, each comparison will cause at least one bit to be dropped from the PN sequence generated by the LFSR300. This process of ignoring at least one bit of the PN sequence is but one way of deterministically introducing non-linearity into the PN sequence of an LFSR.

Another alternative suggests simply masking at least one bit of the PN sequence. In such an embodiment, switch S2 would be replaced by a signal invertor. Accordingly, upon each comparison by the comparator 330, the state of at least one bit of the PN sequence would be inverted. Again, this process of masking at least one bit of the PN sequence is an effective means of deterministically introducing non-linearity into the PN sequence, thereby rendering the original PN sequence virtually impervious to attack.

Yet another embodiment suggests that non-linearity may be deterministically introduced into the PN sequence of an LFSR output by altering the relative position of at least one bit of the original PN sequence upon the occurrence of some specified trigger condition. Accordingly, unique to the present invention is the deterministic introduction of non-linearity into the PN sequence of an LFSR output signal in order to protect the LFSR output from cryptographic attack. In this fashion, the cryptanalyst's task is made increasingly more difficult, thereby rendering the cryptosystem virtually indecipherable. While particular embodiments of the invention have been described herein, it will be obvious that additional modifications may be made without departing from the spirit of this disclosure.

In summary, the present invention discloses a a method of protecting a pseudorandom (PN) signal generated by a Linear Feedback Shift Register (LFSR) from cryptographic attack. This is accomplished by first receiving a PN output signal generated by an LFSR, or by clocking an LFSR to produce a PN output signal. Thereafter, non-linearity is deterministically introduced into the PN signal by masking or ignoring the state of at least one bit of the PN signal, or repositioning the location of at least one bit of the PN signal to produce a deterministic bit pattern. Next, the deterministic bit pattern is substituted in place of the LFSR PN signal, thereby protecting the PN signal from cryptographic attack.

What is claimed is:

1. A method of protecting a pseudorandom (PN) signal generated by a Linear Feedback Shift Register (LFSR) from cryptographic attack comprising the steps of:
   deterministically introducing non-linearity into the PN signal to produce a deterministic bit pattern; and
   substituting the deterministic bit pattern for the PN signal,
   whereby the PN signal is protected from cryptographic attack.

2. The method of claim 1 wherein the step of deterministically introducing non-linearity into the PN signal further comprises the step of:
   altering at least one bit of the PN signal.

3. The method of claim 2 wherein the step of altering at least one bit of the PN signal further includes the steps of:
   adding at least a portion of the LFSR content to at least a portion of the register content to obtain an address;
   fetching a look-up table entry from a look-up table at a location corresponding to the address; and
   comparing the look-up table entry to a reference to determine a match.

4. The method of claim 3 wherein the step of adding is a modulo-two addition.

5. The method of claim 2 wherein the step of altering at least one bit of the PN signal is an alteration selected from the group of alterations consisting of:
- masking the state of at least one bit of the PN signal;
- ignoring the state of at least one bit of the PN signal; and
- repositioning the location of at least one bit of the PN signal, upon a comparison.

6. The method of claim 2 wherein the reference is a bit pattern selected from the group of bit patterns consisting of:
- LFSR contents;
- flip flop contents;
- latch contents;
- shift register contents;
- working register contents;
- memory device address contents; and
- software variable contents.

7. A method Of protecting a pseudorandom (PN) signal generated by a Linear Feedback Shift Register (LFSR) from cryptographic attack comprising the steps of:
- clocking an LFSR to produce a PN signal;
- altering at least one bit of the PN signal to produce a deterministic bit pattern; and
- substituting the deterministic bit pattern for the PN signal,
- whereby non-linearity is deterministically introduced into the PN signal to protect it from cryptographic attack.

8. The method of claim 7 further comprising the step of:
- initializing the LFSR to an initial state.

9. The method of claim 7 wherein an LFSR is a medium selected from the group of storage media consisting of:
- flip flops;
- latches;
- shift registers;
- working registers;
- memory device addresses; and
- software variables.

10. The method of claim 7 wherein the step of altering at least one bit of the PN signal further includes the steps of:
- adding the LFSR content to a register content to obtain an address;
- fetching a look-up table entry from a look-up table at a location corresponding to the address; and
- comparing the look-up table entry to a reference to determine a match.

11. The method of claim 10 wherein the step of adding is a modulo-two addition.

12. The method of claim 10 wherein the step of altering at least one bit of the PN signal is an alteration selected from the group of alterations consisting of:
- masking the state of at least one bit of the PN signal;
- ignoring the state of at least one bit of the PN signal; and
- repositioning the location of at least one bit of the PN signal, upon a comparison.

13. The method of claim 10 wherein the reference is a bit pattern selected from the group of bit patterns consisting of:
- LFSR contents;
- flip flop contents;
- latch contents;
- shift register contents;
- working register contents;
- memory device address contents; and
- software variable contents.

14. A method of protecting the pseudorandom (PN) sequence generated by a Linear Feedback Shift Register(LFSR) from cryptographic attack comprising the steps of:
- clocking an LFSR to produce an PN sequence;
- adding at least a portion of the LFSR's content to a register content to obtain an address;
- fetching a look-up table entry from a look-up table at a location corresponding to the address;
- comparing the look-up table entry to a reference to determine a match;
- altering at least one bit of the PN sequence upon a comparison, to produce a deterministic bit pattern; and
- substituting the deterministic bit pattern for the PN sequence,
- whereby non-linearity is deterministically introduced into the PN signal to protect it from cryptographic attack.

15. The method of claim 14 wherein an LFSR is a medium selected from the group of storage media consisting of:
- flip flops;
- latches;
- shift registers;
- working registers;
- memory device addresses; and
- software variables.

16. The method of claim 14 wherein the step of adding is a modulo-two addition.

17. The method of claim 14 wherein the step of altering at least one bit of the PN sequence is a alteration selected from the group of alterations consisting of:
- masking the state of at least one bit of the PN sequence;
- ignoring the state of at least one bit of the PN sequence; and
- repositioning the location of at least one bit of the PN sequence.

18. The method of claim 14 wherein the reference is a bit pattern selected from the group of bit patterns consisting of:
- LFSR contents;
- flip flop contents;
- latch contents;
- shift register contents;
- working register contents;
- memory device address contents; and
- software variable contents;

19. An apparatus for protecting the pseudorandom (PN) signal generated by a Linear Feedback Shift Register (LFSR) from cryptographic attack comprising:
- means for deterministically introducing non-linearity into a PN signal to produce a deterministic bit pattern; and
- substituting means, coupled to the means for deterministically introducing non-linearity, for substituting the the deterministic bit pattern for the PN signal,
- whereby the PN signal is protected from cryptographic attack.

20. An apparatus for protecting the pseudorandom (PN) sequence generated by a Linear Feedback Shift Register (LFSR) from cryptographic attack comprising:
- LFSR means for producing a PN sequence;
- altering means, coupled to the LFSR means, for altering at least one bit of the PN sequence to produce a deterministic bit pattern; and
- substituting means, coupled to the altering means, for substituting the deterministic bit pattern for the PN sequence, whereby non-linearity is deterministically introduced into the PN signal to protect it from cryptographic attack.

* * * * *

UNITED STATES PATENT AND TRADEMARK OFFICE
CERTIFICATE OF CORRECTION

PATENT NO. : 5,060,265

DATED : October 22, 1991

INVENTOR(S) : Louis D. Finkelstein

It is certified that error appears in the above-identified patent and that said Letters Patent is hereby corrected as shown below:

In column 4, line 42, claim 1, delete "Linear Feedback Shift Register (LFSR)" and insert --PN signal generator--.

In column 4, line 60, claim 3, delete "LFSR" and insert --PN signal generator--.

In column 4, line 61, claim 3, delete "the" and insert --a--.

In column 5, line 10, claim 6, delete "2" and insert --3--.

In column 5, line 20, claim 7, delete "Of" and insert --of--.

In the Abstract, line 2, "linear" should be --Linear--.

Signed and Sealed this

Thirty-first Day of August, 1993

Attest:

BRUCE LEHMAN

*Attesting Officer*  *Commissioner of Patents and Trademarks*